US012148414B2

(12) United States Patent
Hendrikse

(10) Patent No.: US 12,148,414 B2
(45) Date of Patent: Nov. 19, 2024

(54) HEARING DEVICE WITH SPEECH RESYNTHESIS, AND RELATED METHOD

(71) Applicant: GN Hearing A/S, Ballerup (DK)

(72) Inventor: Antonie Johannes Hendrikse, Ballerup (DK)

(73) Assignee: GN HEARING A/S, Ballerup (DK)

( * ) Notice: Subject to any disclaimer, the term of this patent is extended or adjusted under 35 U.S.C. 154(b) by 298 days.

(21) Appl. No.: 17/331,094

(22) Filed: May 26, 2021

(65) Prior Publication Data

US 2021/0390942 A1 Dec. 16, 2021

(30) Foreign Application Priority Data

Jun. 15, 2020 (DK) ........................... PA 2020 70387

(51) Int. Cl.
*G10L 13/04* (2013.01)
*H04R 25/00* (2006.01)

(52) U.S. Cl.
CPC ............ *G10L 13/04* (2013.01); *H04R 25/505* (2013.01); *H04R 2225/43* (2013.01)

(58) Field of Classification Search
CPC ......... G10L 19/09; G10L 25/93; G10L 19/04; G10L 13/04; H04R 25/505; H04R 2225/43
USPC .......................... 381/312; 704/207–208, 212
See application file for complete search history.

(56) References Cited

U.S. PATENT DOCUMENTS 7,676,372 B1 3/2010 Oba
8,923,542 B2 12/2014 Kilsgaard et al.
9,437,213 B2 9/2016 Zakarauskas et al.
2002/0012438 A1 1/2002 Leysieffer et al.
2006/0206320 A1 9/2006 Li
2010/0105266 A1 4/2010 Olver
2011/0135126 A1 6/2011 Gozen
2012/0215532 A1 8/2012 Foo et al.
2017/0118326 A1 4/2017 Mani et al.
2018/0176696 A1 6/2018 Voigt Pedersen
2019/0261098 A1 8/2019 Kavalekalam et al.
2019/0327564 A1 10/2019 Pedersen
2020/0204930 A1 6/2020 Oddershede et al.

FOREIGN PATENT DOCUMENTS

EP 3419310 12/2018

OTHER PUBLICATIONS

Foreign 1st Technical Exam Report for Danish Patent Appln. No. PA 2020 70387 dated Dec. 14, 2020.
Extended European Search Report for EP Patent Appln. No. 21179486.2 dated Jul. 11, 2022.

(Continued)

*Primary Examiner* — George C Monikang

(74) *Attorney, Agent, or Firm* — Vista IP Law Group, LLP

(57) ABSTRACT

Hearing device and method of speech synthesis in a hearing device is disclosed, the method comprising obtaining a pulse input signal based on an input signal; determining one or more pulse parameters including a first pulse parameter based on the pulse input signal; synthesizing a speech signal based on the first pulse parameter; processing the speech signal for provision of an electrical output signal; and converting the electrical output signal to an audio output signal.

11 Claims, 6 Drawing Sheets

(56) References Cited

OTHER PUBLICATIONS

Kaustubh Banninthaya K et al: "Reconfigurable Warped Digital Filter Architecture for Hearing Aid", 2019 International Conference on Communication and Electronics Systems (ICCES), IEEE, Jul. 17, 2019 (Jul. 17, 2019), pp. 459-463, XP033717751, DOI: 10.1109/ICCES45898.2019.9002522 *the whole document *.
Partial European Search Report for EP Patent Appln. No. 21179486.2 dated Apr. 8, 2022.
Kaustubh Banninthaya K., et al., "Reconfigurable Warped Digital Filter Architecture for Hearing Aid," Proceedings of the Fourth International Conference on Communication and Electronics Systems (ICCES 2019).
Notice of Allowance for U.S. Appl. No. 17/946,011 dated Jun. 14, 2024.
Extended European Search Report for EP Patent Appln. No. 201602457.4 dated Apr. 28, 2020.
PCT International Search Report and Written Opinion for International Appln. No. PCT/EP2021/056196 dated Mar. 29, 2021.
Lopatka K et al.: "Detection, classification and localization of acoustic events in the presence of background noise for acoustic surveillance of hazardous situations", Multimedia Tools and Applications, Kluwer Academic Publishers, Boston, US, vol. 75, No. 17, Dec. 2, 2015 (Dec. 2, 2015), pp. 10407-10439, XP036044331, ISSN: 1380-7501, DOI: 10.1007/S11042-015-3105-4 [retrieved on Dec. 2, 2015] p. 10411 equations I, 2.
Foreign 2nd Technical Exam Report for Danish Patent Appln. No. PA 2020 70387 dated Jul. 14, 2021.
Notice of Allowance for U.S. Appl. No. 17/946,011 dated Jul. 26, 2024.

HEARING DEVICE WITH SPEECH RESYNTHESIS, AND RELATED METHOD

RELATED APPLICATION DATA

This application claims priority to, and the benefit of, Danish Patent Application No. PA 2020 70387 filed Jun. 15, 2020. The entire disclosure of the above application is expressly incorporated by reference herein.

FIELD

The present disclosure relates to a hearing device and related methods including a method of speech resynthesis in a hearing device.

BACKGROUND

An important task for a hearing device is the increase of a user's ability to hear speech. Challenges remain in providing satisfactory and/or improved resynthesis of speech in a hearing device.

SUMMARY

Accordingly, there is a need for hearing devices and methods with improved speech resynthesis.

A method of speech synthesis in a hearing device is provided, the method comprising obtaining a pulse input signal based on an input signal; determining one or more pulse parameters including a first pulse parameter based on the pulse input signal; synthesizing a speech signal, e.g. based on the first pulse parameter; processing the speech signal for provision of an electrical output signal; and converting the electrical output signal to an audio output signal.

Further, a hearing device is disclosed, the hearing device comprising a pulse detector configured to determine one or more pulse parameters including a first pulse parameter; a speech synthesizer connected to the pulse detector for provision of a speech signal, e.g. based on the first pulse parameter; a processor for processing the speech signal for provision of an electrical output signal; and a receiver for converting the electrical output signal to an audio output signal.

It is an important advantage of the present disclosure that a robust and failsafe speech synthesis is provided by controlling speech synthesis with a pulse detector with built-in verification of detection accuracy reflected in one or more pulse parameters.

It is an advantage of the present disclosure that the pulse period determination delay is well under one period of the input signal in turn providing a fast pulse detection. On the other hand, local maxima leading to false positives are reduced and thereby providing fast, accurate and reliable pulse detection in turn leading to improved speech resynthesis.

It is an advantage of the present disclosure that each period in the power estimation comprises one pulse or at least has improved likelihood of each period in the power estimation only comprising one pulse. In particular, the present disclosure facilitates that a pulse moment does not occur at the start or end of a period in turn making the pulse power estimate more robust. By aligning the smoothing periods with the end of the hold periods (when a pulse is detected in accordance with the pulse detection criterion being satisfied), a slight error has a much smaller impact on the (power) estimate.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
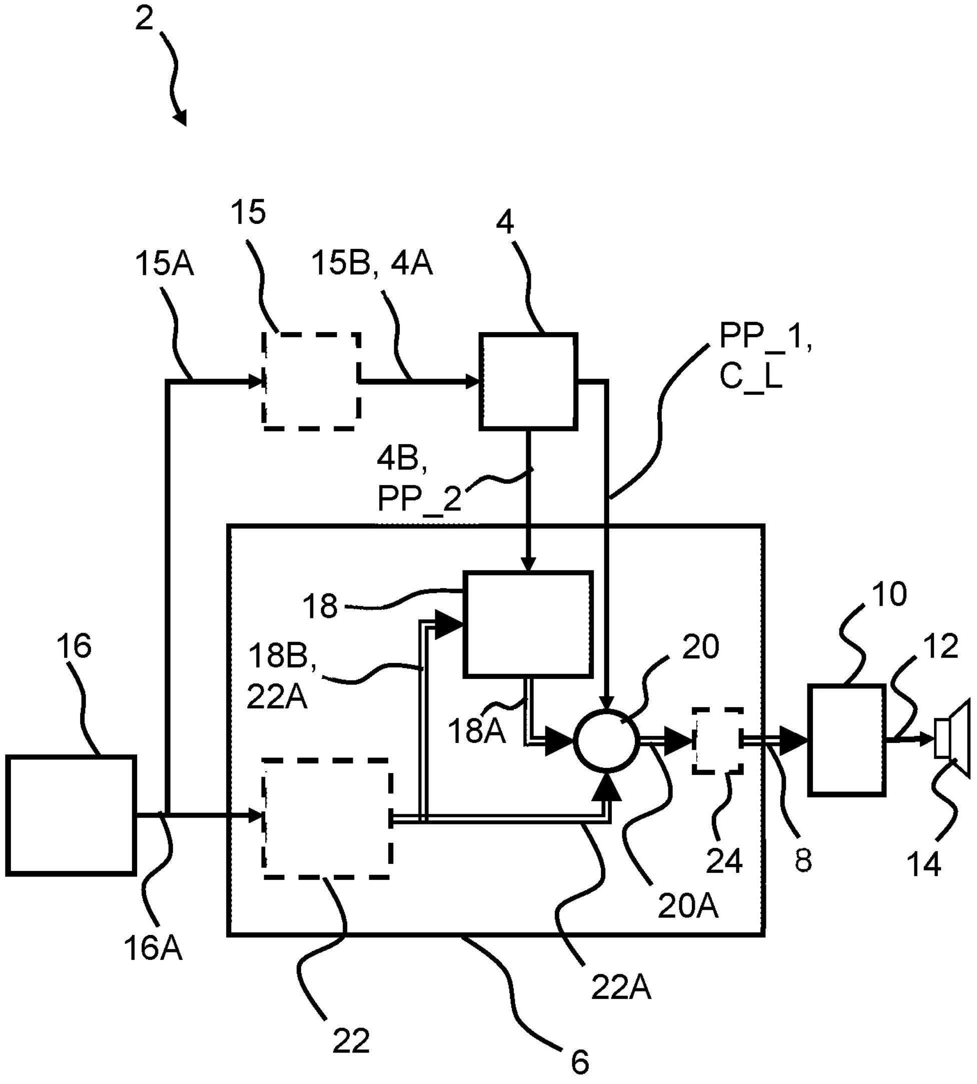
FIG. 1 schematically illustrates an exemplary hearing device.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing device is disclosed. The hearing device may be a hearable or a hearing aid, wherein the processor is configured to compensate for a hearing loss of a user.

The hearing device may be configured to be worn at an ear of a user and may be of the behind-the-ear (BTE) type, in-the-ear (ITE) type, in-the-canal (ITC) type, receiver-in-canal (RIC) type or receiver-in-the-ear (RITE) type. The hearing aid may be a binaural hearing aid. The hearing device may comprise a first earpiece and a second earpiece, wherein the first earpiece and/or the second earpiece is an earpiece as disclosed herein.

The hearing device comprises an input module comprising a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal. The input module provides one or more input signals, e.g. based on one or more microphone signals and/or one or more transceiver input signals. The input module may be configured to pre-process microphone input signal(s) and/or transceiver input signal(s), the pre-processing optionally including beamforming and/or feedback suppression. In other words, the input module may comprise a pre-processor optionally including a beamforming module and/or a feedback suppressor. An input signal from the input module may be fed as the pulse input signal, e.g. to a pulse detector, and/or to the speech synthesizer.

Methods and hearing devices with improved speech resynthesis is provided. Further, more accurate pulse detection and/or power estimation are provided. Further, pulse detectors with improved pulse detection are provided.

A method of power estimation and/or pulse detection in a hearing device is disclosed, e.g. for use in speech synthesis in a hearing device, the method comprising obtaining a pulse input signal; determining if the pulse input signal satisfies a first rising criterion; in accordance with the input signal satisfying the first rising criterion, updating and/or increasing a threshold; determining if the pulse input signal satisfies a first down count criterion; in accordance with the pulse input signal satisfying the first down count criterion, initializing a down counter; determining if the down counter satisfies a second down count criterion; in accordance with the down counter satisfying the second down count criterion, updating and/or decreasing the down counter; determining if the down counter satisfies a pulse detection criterion; and in accordance with the down counter satisfying the pulse detection criterion, outputting a pulse output signal indicative of detection of a pulse. The method optionally comprises estimating, e.g. calculating and/or determining, one or more powers of an input signal based on the pulse output signal.

In one or more exemplary hearing devices, the hearing device comprises a pulse detector for provision of a pulse output signal indicative of detection of a pulse. The hearing device may comprise a first power estimator connected to the pulse detector, the first power estimator configured for provision of a first power output, e.g. based on a first power input and/or the pulse output signal. The hearing device may comprise a mixing module and optionally a filterbank or second power estimator, the mixing module connected to the first power estimator for provision of a mixed output signal based on the first power output and optionally a filterbank output of the filterbank or a second power output. The pulse detector may be configured to: obtain a pulse input signal; determine if the pulse input signal satisfies a first rising criterion; in accordance with the input signal satisfying the first rising criterion, increase the threshold; determine if the pulse input signal satisfies a first down count criterion; in accordance with the pulse input signal satisfying the first down count criterion, initialize a down counter; determine if the down counter satisfies a second down count criterion; in accordance with the down counter satisfying the second down count criterion, decrease the down counter; determine if the down counter satisfies a pulse detection criterion; and in accordance with the down counter satisfying the pulse detection criterion, output, e.g. to a speech synthesizer, the pulse output signal indicative of detection of a pulse and one or more pulse parameters. Also disclosed is a pulse detector as described herein.

A method of speech synthesis, e.g. in a hearing device, is disclosed. The method comprises obtaining a pulse input signal based on an input signal. The input signal may be based on one or more microphone input signals. The pulse input signal may be power signal, such as a linear power signal from a linear power estimator also denoted second power estimator.

The method comprises determining one or more pulse parameters including a first pulse parameter based on the pulse input signal. Determining one or more pulse parameters may comprise determining a second pulse parameter and/or a third pulse parameter. The pulse parameter(s), such as the first parameter may be included in the pulse output signal indicative of detection of a pulse. The method may comprise, e.g. as part of determining one or more pulse parameters, outputting, e.g. to speech synthesizer, one or more pulse parameters, such as one or more of the first pulse parameter and/or the second pulse parameter.

Further, a hearing device is disclosed, the hearing device comprising a pulse detector configured to determine one or more pulse parameters including a first pulse parameter; a speech synthesizer connected to the pulse detector for provision of a speech signal, e.g. based on the first pulse parameter; a processor for processing the speech signal for provision of an electrical output signal; and a receiver for converting the electrical output signal to an audio output signal. It is to be understood that the hearing device disclosed herein may be configured to perform the methods disclosed herein.

The method comprises synthesizing a speech signal, e.g. based on one or a plurality of the pulse parameter, such as based on the first pulse parameter and/or the second pulse parameter. Synthesizing a speech signal may comprise mixing a first power output and a second (power) output based on the first pulse parameter. In other words, the first pulse parameter may control a mixing of a first power output and a second (power) output. The first power output may be based on pulse output signal indicative of detection of a pulse and/or the second pulse parameter. Synthesizing a speech signal is based on the input signal from an input module, e.g. the input signal is processed in speech synthesizer based on one or more pulse parameters and/or pulse output signal as control inputs to the speech synthesizer. For example, the first pulse parameter may control a mixing of a first (power) output and a second (power) output of first and second (power) estimators, respectively. The first (power) output may be based on the second (power) output and/or the input signal. The second (power) output may be based on the input signal.

The method comprises processing the speech signal for provision of an electrical output signal. Processing the speech signal may comprise performing hearing loss compensation on the speech signal, e.g. by multi-band compression and/or multi-band filtering.

The method comprises converting the electrical output signal to an audio output signal, e.g. with a receiver of the hearing device.

The first pulse parameter may be a confidence level C_L. The confidence level C_L may be indicative of accuracy of the pulse detection and/or the likelihood of the pulse input signal being a periodic or semi-periodic pulse signal.

The first pulse parameter ay be indicative of the presence of a pulse or a pulse event.

In one or more exemplary methods/hearing devices, the first pulse parameter is a pulse period. The pulse period may be solely based on a value of a pulse timer at the time of pulse detection. The pulse period may be a smoothed value of a pulse timer at the time of pulse detection, e.g. when moving to the first state. The first pulse parameter may be a pulse height.

In one or more exemplary methods, determining one or more pulse parameters comprises determining a second pulse parameter based on the pulse input signal; and wherein synthesizing the speech signal is optionally based on the second pulse parameter.

The second pulse parameter may be a confidence level, e.g. indicative of accuracy of the pulse detection and/or indicative of a likelihood of the pulse input signal being a periodic or semi-periodic pulse signal. In other words, the confidence level may be indicative of the pulse input signal being of a specific type, e.g. a periodic signal or a semi-periodic signal. The confidence level may be a value in the range from 0 to 1, e.g. where a high confidence level is indicative of a high pulse detection accuracy and/or a high likelihood of the pulse input signal being a periodic or semi-periodic pulse signal. A low confidence level may be indicative of a low pulse detection accuracy and/or a low likelihood of the pulse input signal being a periodic or semi-periodic pulse signal.

The second pulse parameter may be indicative of the presence of a pulse or a pulse event. The second pulse parameter may be a pulse height.

In one or more exemplary methods, determining one or more pulse parameters comprises determining a third pulse parameter based on the pulse input signal; and wherein synthesizing the speech signal is based on the third pulse parameter.

The third pulse parameter may be a pulse height. Determining a pulse height, e.g. as a first, second, or third pulse parameter, may be performed at the time of pulse detection, e.g. when moving to the first state.

In one or more exemplary methods, the method comprises detecting a pulse based on the pulse input signal and in accordance with a detection of a pulse, outputting a pulse output signal indicative of detection of a pulse. In other words, the pulse output signal may be indicative of detection of a pulse, the presence of a pulse and/or a pulse event. The pulse output signal may comprise one or more pulse parameters.

In one or more exemplary methods, the act of synthesizing the speech signal is based on the pulse output signal. In other words, synthesizing the speech signal may be based on, such as controlled by, the pulse output signal.

In one or more exemplary methods, the method comprises filtering the input signal, e.g. with a filterbank also denoted second estimator, for provision of a filterbank output/second output. The second output may be a second power output. Synthesizing the speech signal may be based on the filterbank output/second output. In one or more exemplary methods, synthesizing the speech signal may comprise processing the second output/filterbank output based on or controlled by the pulse output signal and/or based on one or more pulse parameters, e.g. confidence level. Synthesizing the speech signal may comprise processing a first power input, e.g. with first power estimator, based on or controlled by the pulse output signal and/or based on one or more pulse parameters, e.g. pulse period, for provision of a first power output. The second (power) output or the input signal may be fed as the first power input. Synthesizing the speech signal may comprise mixing the first power output and the second power output based on one or more pulse parameters, such as the first pulse parameter, for provision of a mixed output signal. For example, the first pulse parameter may be used for controlling a first gain applied the first power output and/or for controlling a second gain applied to the second power output. The method may comprise outputting the mixed output signal as the speech signal. In one or more exemplary methods, the method comprises converting the mixed output signal to the dB domain for provision of a converted output signal and outputting the converted output signal as the speech signal.

In one or more exemplary methods, determining one or more pulse parameters including a first pulse parameter based on the pulse input signal comprises determining if the pulse input signal satisfies a first rising criterion; and in accordance with the input signal satisfying the first rising criterion, increasing a threshold; determining if the pulse input signal satisfies a first down count criterion; in accordance with the pulse input signal satisfying the first down count criterion, initializing a down counter; determining if the down counter satisfies a second down count criterion; in accordance with the down counter satisfying the second down count criterion, decreasing the down counter; determining if the down counter satisfies a pulse detection criterion; and in accordance with the down counter satisfying the pulse detection criterion, determining the first pulse parameter based on a pulse timer.

The pulse period may be set to the value of the pulse timer at or upon determining that the down counter satisfies a pulse detection criterion, i.e. at the time a pulse is detected. Determining the first pulse parameter may comprise adjusting, such as smoothing, the instantaneous pulse period (value of pulse timer) at pulse detection, e.g. with a smoothing function and/or based on a forgetting factor and/or based on the confidence level. Adjusting, such as smoothing, the instantaneous pulse period (value of pulse timer) at pulse detection (e.g. when moving to first state) may be based on a previously determined first pulse parameter, e.g. the latest determined first pulse parameter.

The method may comprise resetting the pulse timer after determining that the down counter satisfies a pulse detection criterion, i.e. at the time a pulse is detected. In this way, the value of the pulse timer when determining that the down counter satisfies a pulse detection criterion is indicative of the pulse period. In one or more exemplary methods, the method may comprise resetting the pulse timer when moving to the first state.

In one or more exemplary hearing devices, the one or more pulse parameters comprises a second pulse parameter; and the speech synthesizer is optionally configured for provision of the speech signal based on the second pulse parameter. The first pulse parameter or the second pulse parameter may be a confidence level indicative of a likelihood of the pulse input signal being a periodic or semi-periodic pulse signal. In other words, the method may comprise determining the first pulse parameter or a second pulse parameter being a confidence level, e.g. in accordance with the down counter satisfying the pulse detection criterion and/or when moving to the first state.

In one or more exemplary hearing devices, the pulse detector is configured to detect a pulse based on the pulse input signal, and in accordance with a detection of a pulse, outputting a pulse output signal indicative of detection of a pulse.

In one or more exemplary hearing devices, to determine one or more pulse parameters including a first pulse parameter based on the pulse input signal comprises determining if the pulse input signal satisfies a first rising criterion; in accordance with the input signal satisfying the first rising criterion, increasing a threshold; determining if the pulse input signal satisfies a first down count criterion; in accordance with the pulse input signal satisfying the first down count criterion, initializing a down counter; determining if the down counter satisfies a second down count criterion; in accordance with the down counter satisfying the second down count criterion, decreasing the down counter; determining if the down counter satisfies a pulse detection criterion; and in accordance with the down counter satisfying the pulse detection criterion, determine the first pulse parameter based on a pulse timer.

The first pulse parameter may be set to the value of the pulse timer at or upon determining that the down counter satisfies a pulse detection criterion, i.e. at the time a pulse is detected, Determining the first pulse parameter may comprise adjusting, such as smoothing, the instantaneous pulse period (value of pulse timer) at pulse detection with a forgetting factor and/or based on the confidence level. Adjusting, such as smoothing, the instantaneous pulse period (value of pulse timer) at pulse detection may be based on a previously determined first pulse parameter, e.g. the latest determined first pulse parameter.

The hearing device/pulse detector may be configured to reset the pulse timer after determining that the down counter satisfies a pulse detection criterion, i.e. at the time a pulse is detected. In this way, the value of the pulse timer when determining that the down counter satisfies a pulse detection criterion is indicative of the pulse period.

The method comprises determining one or more pulse parameters, e.g. including a first pulse parameter based on the pulse input signal. Determining one or more pulse parameters may comprise determining, e.g. in a first state, if the pulse input signal satisfies a first rising criterion. The method may comprise, e.g. in the first state or when moving to the first state, initialising or resetting the threshold and/or resetting a pulse timer. In one or more exemplary methods, the threshold may be initiated to a value larger than a mean value of the pulse input signal, such as larger than 1.2 times a mean value of the pulse input signal.

The method optionally comprises, in accordance with the input signal satisfying the first rising criterion, increasing a threshold; and determining, e.g. in a second state, if the pulse input signal satisfies a first down count criterion. The method comprises, in accordance with the pulse input signal satisfying the first down count criterion, initializing a down counter; and determining, e.g. in a third state, if the down counter satisfies a second down count criterion. The method comprises, in accordance with the down counter satisfying the second down count criterion, decreasing the down counter. The method comprises determining, e.g. in the third state, if the down counter satisfies a pulse detection criterion; and in accordance with the down counter satisfying the pulse detection criterion, determining one or more pulse parameters, e.g. based on the pulse timer and/or the threshold, and/or outputting a pulse output signal indicative of detection of a pulse. The method may comprise, in accordance with the down counter satisfying the pulse detection criterion, outputting one or more pulse parameters, such as the first pulse parameter and/or the second pulse parameter.

The method may comprise, in accordance with the pulse input signal satisfying the first rising criterion, moving from a first or initial state to a second or rising state. The method may in the second state increase the threshold, e.g. based on the pulse input signal.

The first rising criterion, also denoted RC_1, may comprise or be given by:

$$x>TH\_1,$$

where x is the pulse input signal or based on the pulse input signal, and TH_1 is a threshold. The threshold TH_1 may be a fixed threshold or an adaptive threshold. The pulse detector may be configured to adapt, initiate, or update the threshold TH_1 e.g. in accordance with the first rising criterion not being satisfied.

The method may comprise determining, e.g. in the first state, if the pulse input signal satisfies a first stay criterion. The method optionally comprises, e.g. in accordance with the pulse input signal satisfying the first stay criterion, updating, e.g. decreasing and/or resetting, the threshold and/or staying in the first state.

The first stay criterion, also denoted SC_1, may comprise or be given by:

$$x=<TH\_1,$$

where x is the pulse input signal or based on the pulse input signal, and TH_1 is the threshold. The pulse detector may be configured to adapt or update the threshold TH_1 in accordance with the pulse input signal satisfying the first stay criterion.

The method may comprise, e.g. in accordance with the pulse input signal satisfying the first down count criterion, moving from the second state to a third or down count state. The method may, e.g. in the third state or when moving from the second state to the third state, comprise initializing a down counter.

The method may comprise, e.g. in accordance with the pulse input signal satisfying the first down count criterion, initializing a down counter. Initializing a down counter may be based on an expected fundamental period also denoted t_fun. In one or more exemplary methods/pulse detectors, initializing a down counter comprises setting the down counter c to a value based on the expected fundamental period, e.g. c=t_fun/3, where c is the down counter and t_fun is an expected fundamental period. In other words, the down counter (c) may be initialized at ⅓ of the expected fundamental period (t_fun). In one or more exemplary method, the expected fundamental period t_fun may be based on, e.g. equal to, the latest determined pulse period.

The first down count criterion, also denoted DCC_1, may comprise or be given by:

$$x<TH\_1$$

where x is the pulse input signal or based on the pulse input signal, and TH_1 is the threshold.

The method may comprise determining, e.g. in the second state, if the pulse input signal satisfies a second stay criterion. The method optionally comprises, e.g. in accordance with the pulse input signal satisfying the second stay criterion, updating the threshold and/or staying in the second state. Updating the threshold may comprise setting or calculating the threshold based on the pulse input signal, e.g. equalizing the threshold TH_1 to the pulse input signal x. In other words, updating the threshold may comprise setting the threshold to the value of the pulse input signal. In other words, the first down count criterion may be based on one or more of the down counter c, the pulse input signal x, and the threshold TH_1.

The second stay criterion, also denoted SC_2, may comprise or be given by:

$$x>=TH\_1$$

where x is the pulse input signal or based on the pulse input signal, and TH_1 is the threshold. The method/pulse detector may be configured to adapt or update the threshold TH_1 in accordance with the pulse input signal satisfying the second stay criterion.

The method comprises determining, e.g. in a third state, if the down counter satisfies a second down count criterion. The second down count criterion, also denoted DCC_2, may comprise or be given by:

$$c>0,$$

where c is the down counter. The method comprises, optionally in accordance with the down counter satisfying the second down count criterion, updating, such as decreasing, the down counter. The second down criterion may also be denoted a third stay criterion.

In one or more exemplary methods, the second down count criterion may comprise or be given by:

$$x=<TH\_1$$

where x is the pulse input signal or based on the pulse input signal, and TH_1 is the threshold. In other words, the second down count criterion may be based on one or more of the down counter c, the pulse input signal x, and the threshold.

The method comprises determining, e.g. in the third state, if the down counter satisfies a pulse detection criterion. The pulse detection criterion, also denoted PDC, may be based on the down counter and/or the threshold. The method may comprise, e.g. in accordance with the down counter satisfying the pulse detection criterion, moving from the third state, e.g. either to the first state or to a fourth state.

The pulse detection criterion may comprise or be given by:

$$c=0 \text{ or } c<0,$$

where c is the down counter. In other words, the pulse detection criterion is satisfied (i.e. pulse detected) in case the pulse input signal x has been decreasing for a period of time after a pulse input signal has peaked.

In one or more exemplary methods, the method comprises determining, e.g. in the third state and/or after determining that the pulse input signal satisfies the first down count criterion, if the pulse input signal satisfies a second rising criterion. The method may comprise, e.g. in accordance with the pulse input signal satisfying the second rising criterion, increasing the threshold and/or moving to the second state. Thus, the method may move back to the rising/second state if the detected maximum of the pulse input signal was merely a temporal maximum. Thereby the number of false positives (pulse detected) is reduced.

The second rising criterion, also denoted RC_2, may comprise or be given by:

$$x>TH\_1$$

where x is the pulse input signal or based on the pulse input signal, and TH_1 is the threshold. The method/pulse detector may be configured to adapt or update the threshold TH_1 e.g. in accordance with the second rising criterion being satisfied.

In one or more exemplary methods, the method comprises determining, e.g. in the first state and/or after determining that the down counter satisfies the pulse detection criterion, if the pulse input signal satisfies a rest criterion. The method may comprise, e.g. in accordance with the pulse input signal satisfying the rest criterion, decreasing the threshold and/or stay in the first state. In other words, the rest criterion may also be referred to as the first stay criterion, see above.

In one or more exemplary methods, initializing a down counter comprises estimating, such as determining/calculating/obtaining, an estimated pulse period; and/or setting the down counter based on the estimated pulse period. The estimated pulse period may be an expected fundamental period also denoted t_fun. The method may comprise determining/calculating/obtaining the expected fundamental period, e.g. in the first state, or when moving to the first state from the third state. The expected fundamental period may be based on the time between detection of a current or latest pulse/peak and detection of the previous pulse. In other words, the expected fundamental period may be based on the time between the latest or current act of moving to the first state and the previous act of moving to the first state.

In the method, estimating a pulse period may be based on the detection of several previous pulses. In one or more exemplary methods, the pulse output signal comprises the estimated pulse period. In other words, the pulse output signal may be indicative of or comprises a period of the latest detected pulse. Estimating a pulse period may be based on a forgetting factor and/or a confidence level.

In one or more exemplary methods/pulse detectors, initializing a down counter comprises setting the down counter c to a value based on the expected fundamental period, e.g. c=t_fun/3, where c is the down counter and t_fun is an expected fundamental period. In other words, the down counter (c) may be initialized at ⅓ of the expected fundamental period (t_fun). The expected fundamental period t_fun may be a fixed value. The expected fundamental period t_fun may be in the range from 2.0 ms to 16 ms, such as in the range from 2.9 ms to 14 ms. Thereby, accurate capturing of human speech is facilitated since the fundamental frequency range of voiced speech (one example of a pulsed power signal) is roughly in the range of 70 Hz to 350 Hz. The expected fundamental period may be determined, e.g. in the first state or when moving to the first state from the third state.

In one or more exemplary methods, the pulse output signal comprises a pulse height (second/third pulse parameter) of the detected pulse. In other words, the pulse output signal may be indicative of or comprises an amplitude of the detected pulse. In one or more exemplary methods, the method comprises determining a pulse height based on the threshold TH_1. For example, the pulse height P_height may be given as:

$$P\_height=TH\_1.$$

In other words, the pulse height P_height may be the value of the threshold TH_1 at the time of moving to the first state, corresponding to the maximum value of the pulse input signal in the second state (where the threshold TH_1 is updated), In one or more exemplary method, the pulse height may be a smoothed pulse height, e.g. based on the currently detected pulse and optionally one or more previously detected pulses (and associated pulse heights).

In one or more exemplary methods, the method comprises determining, e.g. after determining that the pulse input signal satisfies the first down count criterion, in the first state, in the second state, and/or in the third state, if a timeout criterion is satisfied. The method may comprise, e.g. in accordance with the timeout criterion, also denoted TOC, being satisfied, resetting the threshold and/or moving to the first state. The method may comprise, e.g. in accordance with the timeout criterion being satisfied, updating such as reducing a confidence level and/or performing prediction/estimation as if a pulse was detected, e.g. at timeout. The timeout criterion may be based on a timer counter tc. The timer counter also denoted tc may be initialized when moving from the first state to the second state, i.e. when the first rising criterion is satisfied.

In one or more exemplary methods, the method comprises estimating an estimated pulse period PP_est, e.g. based on the detected pulse/peak and/or a previously detected pulse. The estimated or predicted pulse period PP_est may be estimated after a peak is detected in the second state (first down count criterion satisfied), e.g. the estimated or predicted pulse period PP_est may be estimated when moving from the second state to the third state. The estimated pulse period PP_est may be based on a forgetting factor and/or the confidence level. The estimated pulse period may be determined in the first state and/or in the second state, such as after determining/updating the confidence level.

In one or more exemplary methods/pulse detectors, initializing a down counter comprises setting the down counter c to a value based on the estimated pulse period, e.g. c=PP_est/3, where c is the down counter and PP_est is the estimated pulse period. In other words, the down counter (c) may be initialized at ⅓ of the estimated pulse period.

In one or more exemplary methods, the method comprises estimating an estimated pulse height P_height_est, e.g. based on the detected pulse and/or one or more previously detected pulses. The estimated pulse height P_height_est may be based on a forgetting factor and/or the confidence level. Determining a pulse height may be based on the estimated pulse height. Estimating an estimated pulse height may comprise filtering pulse heights, e.g. with a weighting filter and/or a leaky average filter, e.g. such that the latest pulse height has the largest impact. The estimated pulse height may be determined in the first state and/or in the second state, such as after determining/updating the confidence level.

In one or more exemplary methods, the method comprises, e.g. as part of synthesizing a speech signal, smoothing or averaging a first power input based on the pulse output signal for provision of a first power output. The method optionally comprises, e.g. as part of synthesizing a speech signal, processing, such as mixing and/or filtering with a mixer/mixing module, the first power output and/or a second power output for provision of a mixed output signal. The mixer may be controlled by a confidence level (pulse parameter) of the pulse output signal. It is to be understood that smoothing may be performed on absolute values instead of squared values ("power domain") Using absolute values for smoothing may potentially save computation power and makes the smoothing more robust, e.g. in case of spike noise. In other words, the method may comprise smoothing a first input based on the pulse output signal for provision of a first output. The method optionally comprises processing, such as mixing and/or filtering with a mixing module, the first power output and/or a second power output for provision of a mixed output signal.

In one or more exemplary methods, the method comprises, e.g. when moving from the third state to the first state, in the fourth state, in accordance with the pulse detection criterion being satisfied, or in accordance with the timeout criterion being satisfied, determining a confidence level also denoted C_L. The confidence level C_L may be indicative of accuracy of the pulse detection (height and/or period) and/or indicative of likelihood of the pulse input signal being a periodic or semi-periodic pulse signal.

In one or more exemplary methods, synthesizing a speech signal based on the first pulse parameter, e.g. including processing, such as mixing and/or filtering, the first power output and/or a filterbank output/second power for provision of a mixed output signal, may be based on or controlled by the confidence level being the first pulse parameter. For example, mixing the first power output and a second power output/filterbank output for provision of a mixed output signal may be based on the confidence level. The mixed output signal may be a weighted sum, e.g. with first and second gains as weights, of the first power output and the filterbank output.

In one or more exemplary methods, synthesizing a speech signal based on the first pulse parameter comprises applying a first gain to the first power output, e.g. in mixing module. The first gain also denoted G_1 may be based on the confidence level. For example, the first gain G_1 may be given as $$G\_1=C\_L,$$

where C_L is the confidence level (first pulse parameter) in the range from 0 to 1.

In one or more exemplary methods, synthesizing a speech signal based on the first pulse parameter comprises applying a second gain to the filterbank output, e.g. in mixing module. The second gain also denoted G_2 may be based on the confidence level C_L. For example, the second gain may be given as $$G\_2=1-C\_L,$$

where C_L is the confidence level (first pulse parameter) in the range from 0 to 1.

The mixed output signal P_M may be based on the first power output P_1 and the filterbank output. P_FB. For example, the mixed output signal P_M may be given as $$P\_M=G\_1*P\_1+G\_2*P\_FB,$$

where G_1 is a first gain and G_2 is a second gain.

Determining a confidence level may comprise comparing the detected pulse (e.g. time of occurrence and/or height/amplitude) with one or more previously detected pulses and/or estimates derived therefrom such as an estimated/predicted pulse height P_height_est and/or a previously estimated/predicted pulse period PP_est.

The confidence level may be based on a comparison of the occurrence of a pulse or peak and an estimated occurrence of the pulse or peak. In other words, an estimated pulse period PP_est (based on previous pulses and/or previous confidence levels) may be compared to the actual pulse period (as indicated by the value of the pulse timer when pulse detection criterion is satisfied). The confidence level is optionally increased if the difference between the detected pulse period and the estimated pulse period is less than a threshold. The confidence level is optionally decreased if the difference between the detected pulse period and the estimated pulse period is larger than a threshold.

The confidence level may be based on a comparison of the actual, current or latest pulse height with an estimated/predicted pulse height P_height_est. In other words, an estimated pulse height (based on previous pulses) may be compared to the actual pulse height (as indicated by the threshold TH_1). The confidence level is optionally increased if the difference between the detected pulse height and the estimated pulse height is less than a threshold. The confidence level is optionally decreased if the difference between the detected pulse height and the estimated pulse height is larger than a threshold.

The confidence level may be based on a comparison of the actual, current or latest pulse height with an average of the pulse input signal. A small difference may be indicative of a pulse input signal that is not pulsed (e.g. confidence level is reduced) and/or a large difference may be indicative of a pulse input signal that is highly pulsed (e.g. confidence level increased).

The confidence level may be based on the estimated pulse period, PP_est, and the detected/actual pulse period (value of pulse timer). The confidence level may be increased if the observed or actual pulse period is equal to or is within a range from the estimated pulse period. The confidence level may be decreased if the observed or actual pulse period differs too much from the estimated pulse period. The confidence level may be in the range from 0 to 1.

The confidence level may be based on the estimated pulse height P_height_est, and the detected/actual pulse height P_height. The confidence level may be increased if the observed or actual pulse height is equal to or is within a range from the estimated pulse height. The confidence level may be decreased if the observed or actual pulse height differs too much, e.g. more than a threshold, from the estimated pulse height.

A hearing device is disclosed. The hearing device comprises a pulse detector configured to determine one or more pulse parameters including a first pulse parameter and optionally configured for provision of a pulse output signal indicative of detection of a pulse. The hearing device comprises a speech synthesizer connected to the pulse detector for provision of a speech signal based on the first pulse parameter. The speech synthesizer may comprise a first power estimator connected to the pulse detector, the first power estimator configured for provision of a first power output, e.g. based on a first power input and/or the pulse output signal; and optionally a mixing module connected to the first power estimator for provision of a mixed output signal, e.g. based on the first power output and/or a second power output such as a filterbank output. The mixed output signal may constitute the speech signal. In other words, the mixed output signal from the mixing module may be fed as the speech signal to the processor for processing the speech signal.

The second power estimator or filterbank may be a multi-band filterbank configured to split the input signal into multiple frequency bands F_1, . . . , F_N, where N is an integer, such as larger than 10. The second power estimator/filterbank may be configured to calculate the (linear) power per band and output the linear power per band, also denoted P_L_1, . . . P_L_N, as second power output/filterbank output.

The first power estimator may be a multi-band power estimator. The first power estimator may be configured to calculate a power estimate per band averaged over one pulse period, also denoted P_P_1, . . . , P_P_N, e.g. based on the pulse output signal and the filterbank output/second power output (first power input). The first power estimator optionally adds and/or integrates power estimates from the second power estimator/filterbank output and divides the sum by the time passed since the last pulse was detected, resulting in multi-band power estimates average over one pulse period. The first power estimator optionally adds and/or integrates power estimates from the second power estimator/filterbank output and divides the sum by the pulse period, e.g. as determined and output by the pulse detector, e.g. as a second pulse parameter of the pulse output signal or as determined by the first power estimator based on the pulse output signal, resulting in multi-band power estimates average over one pulse period.

The mixing module may be a multi-band mixing module. The mixing module may be connected to the pulse detector for receiving a pulse parameter as a control signal, such as a first pulse parameter optionally being a confidence level. The control signal (first pulse parameter) may control the mixing of the second power output/filterbank output and the first power output. In other words, the mixing module may be connected to the second power estimator/filterbank and the first power estimator for receiving the second power output/filterbank output and the first power output, respectively. For example, the confidence level or generally the first pulse parameter may control a mixing ratio between the second power output/filterbank output and the first power output. The confidence level or generally the first pulse parameter may control coefficients or gains applied to (e.g. multiplied with or added to) the second power output/filterbank output and the first power output.

The hearing device may comprise, e.g. as part of pulse detector or speech synthesizer, an input power estimator for provision of an input power output. The input power output may be fed as pulse input signal to the pulse detector. The input power estimator may be configured to calculate a linear power estimate for provision of a broadband linear power estimate, also denoted P_L_B, as the input power output. In other words, the input power output may be a broadband linear power estimate. In one or more exemplary hearing devices, the input signal is fed as pulse input signal to the pulse detector.

The hearing device/speech synthesizer optionally comprises a converter for converting the mixed output signal to a converter output. The converter may be a logarithmic converter, i.e. the converter output may be in the dB domain. The converter output may constitute the speech signal. In other words, the converter output may be fed as the speech signal to the processor for processing the speech signal.

The pulse detector is configured to obtain a pulse input signal and optionally to determine, e.g. in a first or rest state, if the pulse input signal satisfies a first rising criterion. The first rising criterion may be based on the pulse input signal and/or one or more thresholds.

The pulse detector is configured to, optionally in accordance with the pulse input signal satisfying the first rising criterion, increase the threshold and determine if the pulse input signal satisfies a first down count criterion.

The pulse detector is configured to, optionally in accordance with the pulse input signal satisfying the first down count criterion, initialize a down counter and determine if the down counter satisfies a second down count criterion.

The pulse detector is configured to, optionally in accordance with the down counter satisfying the second down count criterion, decrease the down counter and determine if the down counter satisfies a pulse detection criterion.

The pulse detector is configured to, optionally in accordance with the down counter satisfying the pulse detection criterion, output the pulse output signal indicative of detection of a pulse.

The pulse detector may be configured to move from the third state to a fourth state in accordance with the pulse detection criterion being satisfied. The pulse detector is optionally configured to, e.g. in the fourth state, update, determine, and/or calculate one or more pulse parameters optionally including one or more of a confidence level, an estimated pulse period, and an estimated pulse height. The pulse detector is optionally configured to, e.g. in the fourth state, reset, update, and/or initialize the threshold.

estimated pulse period, and an estimated pulse height. The one or more pulse parameters may be based on the detected/actual pulse (e.g. time of occurrence and height/amplitude) and one or more previously detected pulses (e.g. time of occurrence and height/amplitude). The one or more pulse parameters may be based on a previously determined confidence level.

According to the present disclosure, a pulse detector, e.g. for a hearing device, is disclosed, wherein the pulse detector is configured to obtain a pulse input signal; determine if the pulse input signal satisfies a first rising criterion; in accordance with the pulse input signal satisfying the first rising criterion, increase the threshold; determine if the pulse input signal satisfies a first down count criterion; in accordance with the pulse input signal satisfying the first down count criterion, initialize a down counter; determine if the down counter satisfies a second down count criterion; in accordance with the down counter satisfying the second down count criterion, decrease the down counter; determine if the down counter satisfies a pulse detection criterion; and in accordance with the down counter satisfying the pulse detection criterion, determine one or more pulse parameters and output the one or more pulse parameters and/or the pulse output signal indicative of detection of a pulse.

FIG. 1 shows an exemplary hearing device. The hearing device 2 comprises a pulse detector 4 configured to determine one or more pulse parameters including a first pulse parameter PP_1 based on a pulse input signal 4A; a speech synthesizer 6 connected to the pulse detector 4 for provision of a speech signal 8 based on the first pulse parameter PP_1; a processor 10 for processing the speech signal 8 for provision of an electrical output signal 12; and a receiver 14 for converting the electrical output signal to an audio output signal.

The hearing device 2 optionally comprises an input power estimator 15 fed with input power input 15A for provision of an input power output 15B. The input power estimator 15 is connected to the pulse detector 4, and the input power output 158 is fed as pulse input signal 4A to the pulse detector 4. The input power estimator 15 may be configured to calculate a linear power estimate for provision of a broadband linear power estimate, also denoted P_L_B, as the input power output 15B. In other words, the input power output 158 may be a broadband linear power estimate.

The hearing device 2 comprises an input module 16 comprising one or more microphones and/or a transceiver module for provision of input signal 16A based on microphone input signal(s) and/or transceiver input signal(s). The input module 16 is connected to the speech synthesizer 6 and the input power estimator 15 for feeding the input signal 16A to speech synthesizer 6 and the input power estimator 15, respectively. The input module 16 may be configured to pre-process microphone input signal(s) and/or transceiver input signal(s), the pre-processing optionally including one or more of filtering, beamforming and feedback suppression, in one or more exemplary hearing devices, the input signal 16A is fed directly to the pulse detector 4 as pulse input signal 4A.

The first pulse parameter PP_1 is a confidence level C_L indicative of the likelihood of the pulse input signal being a periodic or semi-periodic pulse signal.

The pulse detector 4 is configured for provision of a pulse output signal 4B indicative of detection of a pulse and/or a second pulse parameter PP_2 being a pulse period detected by the pulse detector 4.

The speech synthesizer 6 comprises a first power estimator 18 for provision of a first power output 6A. The first power estimator 18 is connected to the pulse detector 4 and receives the pulse output signal 4A and/or second pulse parameter PP_2 for provision of a first power output 18A. The speech synthesizer 6 comprises a mixing module 20 connected to the first power estimator 18 and configured for provision of a mixed output signal 20A also denoted P_M. The speech synthesizer 6 optionally comprises a second power estimator 22, such as a filterbank, for provision of a second power output 22A, such as a filterbank output. The output of the second power estimator 22 is connected to the first power estimator 18 and the mixing module 20 for feeding the second power output 22A or at least part(s) thereof to the first power estimator 18 and the mixing module 20, respectively. In one or more exemplary hearing devices, the input signal 16A from input module 16 may be fed directly to the first power estimator 18 and the mixing module 20, The first power estimator 18 or period smoother is configured for provision of a first power output 18A based on a first power input 18B (second power output 22A) and the pulse output signal 4A/second pulse parameter PP_2. The first power estimator 18 provides a power estimate per frequency band, averaged over one pulse period. In other words, the first power estimator 18 smooths frequency-band power estimates over one period and the first power output 18A is a multi-band power estimate per band averaged over one pulse period.

The mixing module 20 is connected to the first power estimator 18 and the second power estimator 22 and configured for provision of a mixed output signal 20A based on the first power output 18A and/or the second power output 22A. The second power output 22A may be a multi-channel output, e.g. separated in N frequency bands. N may be larger than 10. The second power output 22A is a linear power estimate per band, i.e. the second power estimator 22 is a power estimator configured to estimate the linear power in one or more bands, e.g. each band.

The hearing device 2/speech synthesizer 6 optionally comprises a converter 24, such as a logarithmic converter, for converting the mixed output signal 20A to the dB domain.

The pulse detector 4 is configured to obtain a pulse input signal 4A and determine if the pulse input signal 4A satisfies a first rising criterion. In accordance with the input signal satisfying the first rising criterion, the pulse detector 4 is configured to increase the threshold and determine if the pulse input signal satisfies a first down count criterion based on the threshold. In accordance with the pulse input signal satisfying the first down count criterion, the pulse detector 4 is configured to initialize a down counter and determine if the down counter satisfies a second down count criterion. In accordance with the down counter satisfying the second down count criterion, the pulse detector 4 is configured to decrease the down counter and determine if the down counter satisfies a pulse detection criterion. In accordance with the down counter satisfying the pulse detection criterion, the pulse detector 4 is configured to output the pulse output signal 4B indicative of detection of a pulse and determine a first pulse parameter PP_1 being a confidence level. The confidence level C_L is based on one or more of a comparison of a detected pulse period and an estimated pulse period, a comparison of a detected pulse height and an estimated pulse height, and a comparison of the detected pulse height with an average of the input signal, e.g. an average of the input pulse signal.

The first power estimator 18 is controlled by the pulse output signal 4B and/or second pulse parameter PP_2. In one or more exemplary hearing devices/speech synthesizers, the pulse output signal 4B triggers the calculation of the period power in the first power estimator 18, e.g. by dividing accumulated energy since last pulse detection with the time between last detected pulse and the presently detected pulse as indicated by the pulse output signal 4B and/or by the second pulse parameter PP_2. The first power estimator 18 may comprise a period timer that is reset every time a pulse is detected (and indicated by the pulse output signal 4B). In other words, the first power estimator 18 may determine a pulse period based on the pulse output signal 4B or receive the pulse period from the pulse detector 4 as a second pulse parameter PP_2.

The pulse detector 4 may be configured to obtain, such as determine, a first pulse parameter, such as a confidence level C_L, e.g. when moving to the first state/in accordance with the down counter satisfying the pulse detection criterion, and control the mixing module 20 based on the first pulse parameter PP_1/confidence level C_L. For example, a high confidence level may increase the amount of first power output 18A in the mixed output signal 20A and/or a low confidence level may decrease the amount of first power output 18A in the mixed output signal 20A. Additionally or alternatively, a high confidence level may decrease the amount of second power output 22A in the mixed output signal 20A and/or a low confidence level may increase the amount of second power output 22A in the mixed output signal 20A.

Figure 2:
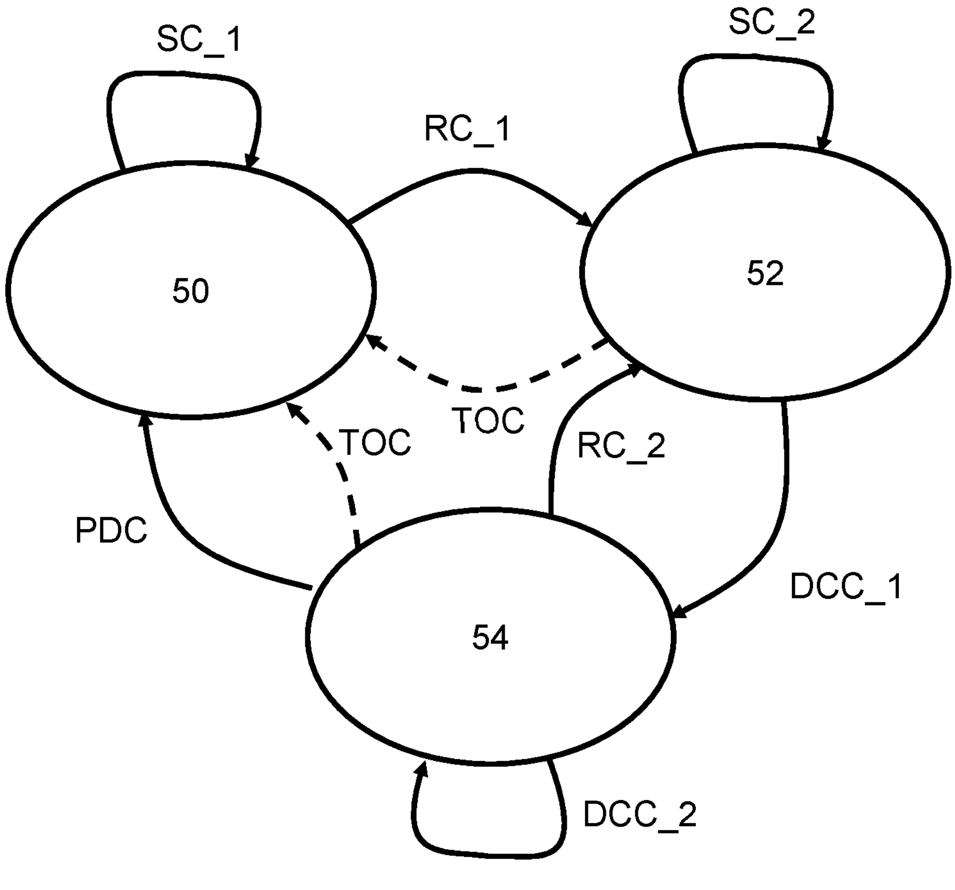
FIG. 2 is an exemplary state diagram of a pulse detector of the hearing device.

FIG. 2 is an exemplary state diagram of a pulse detector of the hearing device, such as hearing device 2. The pulse detector, e.g. pulse detector 4, starts in a first state 50 also referred to as rest state. The pulse detector stays in the first state 50 if first stay criterion SC_1 is satisfied, i.e. if the pulse input signal x<=TH_1, where TH_1 is a threshold. Staying in the first state, i.e. in accordance with the first stay criterion being satisfied, comprises updating the threshold by decreasing the threshold TH_1, if an input pulse arrives, the pulse input signal x rises above the threshold TH_1 and the first rising criterion RC_1: x>TH_1 is satisfied, and the pulse detector moves to the second state 52 or rising state. In the second state 52, the threshold TH_1 is set to the input pulse signal, i.e. TH_1:=x. If the pulse passes, the input pulse signal x drops below the threshold TH_1 (first down count criterion DCC_1: x<TH_1 is satisfied) and the pulse detector transitions or moves from the second state 52 into a third state 54, also denoted down count state. When moving to the third state 54, a down counter (c) is initialized by setting the down counter c to a value based on an estimated pulse period or expected fundamental period, e.g. c=a1*t_fun, where a1 is a value in the range from 0 to 1, such as in the range from 0.2 to 0.5, e.g. 0.33 (⅓), and t_fun is an expected fundamental period.

The pulse detector may in the second state 52 determine if the pulse input signal satisfies a second stay criterion SC_2, e.g. if x>=TH_1, which is indicative of a rising edge of the pulse input signal. In accordance with the pulse input signal satisfying the second stay criterion, the pulse detector may update the threshold TH_1 by setting the threshold to the value of the pulse input signal, i.e. TH_1:=x and stay in the second state. Updating the threshold TH_1 may comprise setting or calculating the threshold based on the pulse input signal, e.g. equalizing the threshold TH_1 to the pulse input signal x.

In the third state 54, the pulse detector optionally moves to the second state 52 in accordance with a second rising criterion RC_2 being satisfied. The second rising criterion may be satisfied if an increase in the pulse input signal x above the threshold TH_1 is detected before the down counter reaches zero. The pulse detector is optionally configured to adapt or update the threshold TH_1 in accordance with the second rising criterion being satisfied, e.g. by setting the threshold to the value of the pulse input signal. i.e. TH_1:=x.

In the third state 54, the pulse detector determines if a second down count criterion DCC_2: c>0 is satisfied and in accordance with the second down count criterion being satisfied, the pulse detector is configured to update the down counter c by degreasing the down counter c e.g. by setting c:=c−1.

The pulse detector is configured to, in the third state 54, determine if a pulse detection criterion PDC is satisfied, e.g. if the down counter c reaches zero or below zero optionally while the pulse input signal x stays below the threshold TH_1. In accordance with the pulse detection criterion being satisfied, the pulse detector returns to the first state 50, determines a confidence level as a first pulse parameter, and outputs a pulse output signal indicative of detection of a pulse and the first pulse parameter. Upon determination of the confidence level. e.g. based on one or more estimates of the currently detected pulse, the pulse detector is configured to determine one or more estimates, such as an estimated pulse height and/or an estimated pulse period. These estimates are then used to determine a confidence level for the subsequently detected pulse.

In other words, the pulse detector, in accordance with the pulse detection criterion being satisfied, optionally performs the following, where i is an index for the i'th pulse:

- Determine pulse height P_height(i) and pulse period PP(i) for the i'th pulse based on TH_1 and value of pulse timer
- Determine first pulse parameter PP_1 being C_L(i) based on PP_est PP(i), P_height_est(i), and P_height(i)
- Output C_L(i) and pulse output signal indicative of detection of a pulse
- Determine PP_est(i+1) and P_height(i+1) based on C_L (i), PP(i), and P_height(i)
- Reset pulse timer and TH_1

In the second state, the threshold is increased to track the current signal value of the pulse input signal. This ensures that the largest peak is detected, even if it is preceded by a slightly smaller spike in the pulse input signal. In the third state (down count), the threshold is maintained at its current value. In the first state, the threshold is continuously decreased, e.g. in accordance with the first stay criterion being satisfied.

The pulse detector may be configured to initialize a timer counter, e.g. when moving from the second state to the third state (i.e. when a peak is detected) and/or when moving from the first state to the second state). The pulse detector may be configured to move to the first state 50 from the second state 52 and/or the third state 54 in accordance with a timeout criterion TOO based on the timer counter being satisfied, Thereby is ensured that the pulse detector does not get stuck in the second state and/or the third state, e.g. if pulses are too close to each other.

The pulse detector may, in accordance with the timeout criterion TOO based on the timer counter being satisfied, perform the following, where i is an index for the i'th pulse:

- Set C_L(i)<C_L(i−1) and determine pulse height P_height(i) and pulse period PP(i) for the i'th pulse based on TH_1 and value of pulse timer or timer counter
- Output C_L(i) and/or pulse output signal indicative of detection of a pulse
- Determine PP_est(i+1) and P_height(i+1) based on C_L (i), PP(i), and P_height(i)
- Reset pulse timer and set TH_1=x It is to be understood that one or more criteria such as the down count criteria DCC_1 and DCC_2 may be implemented using one or more up counters and thresholds for up counter values.

Figure 3:
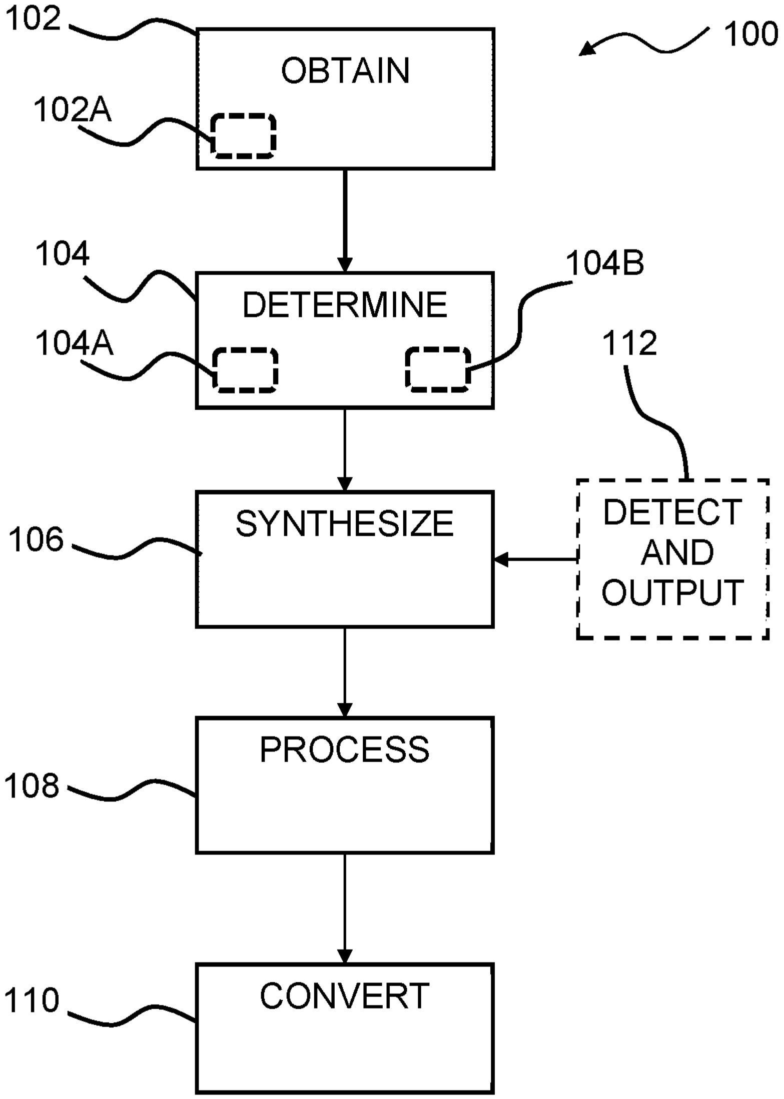
FIG. 3 is a flow diagram of an exemplary method according to the disclosure.

FIG. 3 shows a flow diagram of an exemplary method of speech synthesis in a hearing device, the method 100 comprising obtaining 102 a pulse input signal based on an input signal; determining 104 one or more pulse parameters including a first pulse parameter based on the pulse input signal; synthesizing 106 a speech signal based on the first pulse parameter; processing 108 the speech signal for provision of an electrical output signal; and converting 110 the electrical output signal to an audio output signal. Obtaining 102 a pulse input signal may comprise obtaining 102A a broadband linear power estimate and use the broadband linear power estimate as the pulse input signal.

Determining 104 one or more pulse parameters including a first pulse parameter comprises determining 104A the first pulse parameter optionally as a confidence level indicative of a likelihood of the pulse input signal being a periodic or semi-periodic pulse signal. Determining 104 one or more pulse parameters including a first pulse parameter optionally comprises determining 104B a second pulse parameter based on the pulse input signal.

The method 100 optionally comprises the act 112 of detecting a pulse based on the pulse input signal and in accordance with a detection of a pulse, outputting a pulse output signal indicative of detection of a pulse. The act 112 of detecting a pulse based on the pulse input signal and in accordance with a detection of a pulse, outputting a pulse output signal indicative of detection of a pulse may be integrated in determining 104 one or more pulse parameters including a first pulse parameter. Synthesizing 106 the speech signal is optionally based on the pulse output signal.

Figure 4:
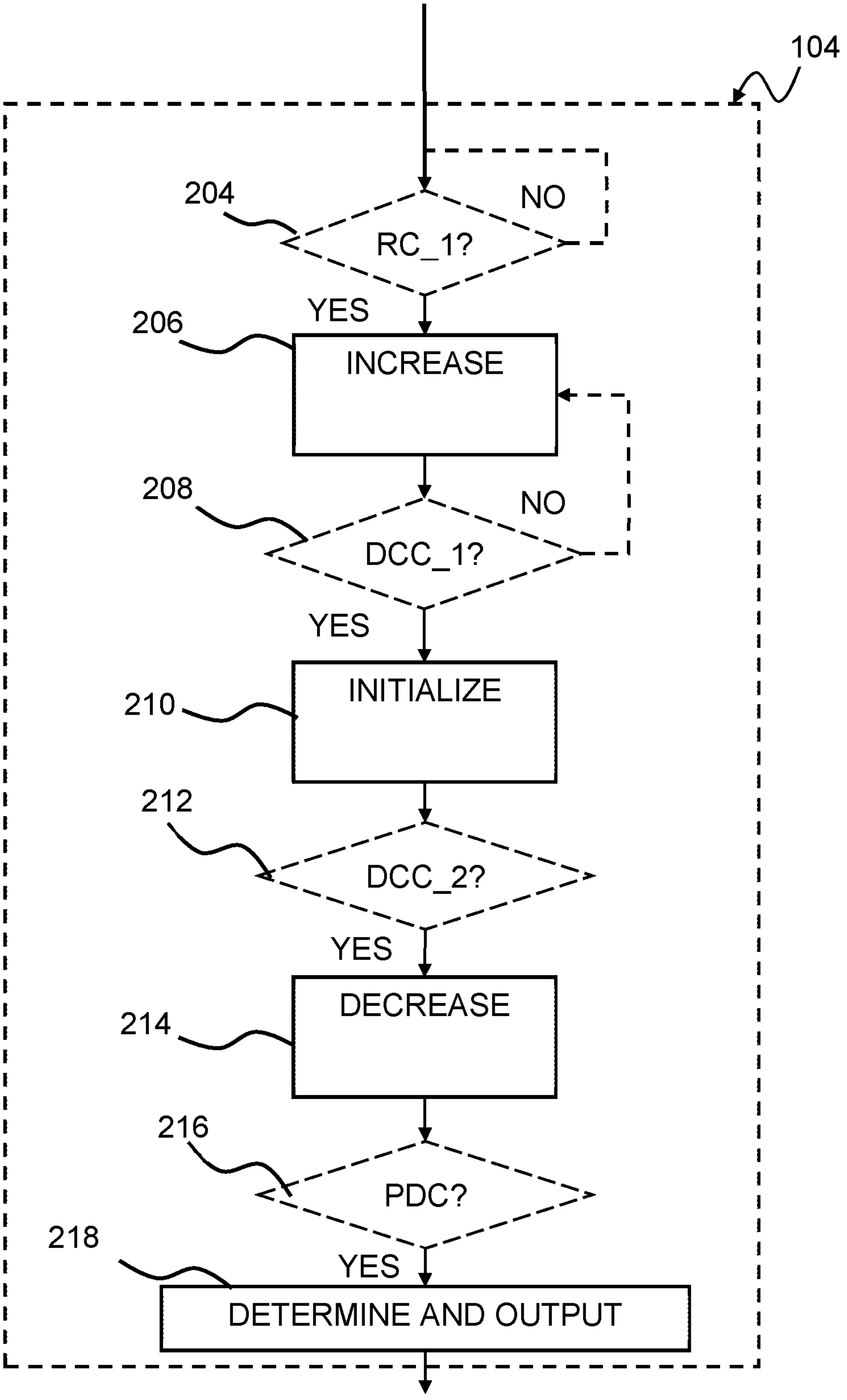
FIG. 4 is a flow diagram of a part of an exemplary method according to the disclosure.

FIG. 4 shows a flow diagram of an exemplary determination of pulse parameters. Determining 104 one or more pulse parameters based on the pulse input signal comprises determining 204 if the pulse input signal satisfies a first rising criterion RC_1; in accordance with the input signal satisfying the first rising criterion, increasing/updating 206 a threshold; determining 208 if the pulse input signal satisfies a first down count criterion DCC_1; in accordance with the pulse input signal satisfying the first down count criterion, initializing 210 a down counter; determining 212 if the down counter satisfies a second down count criterion DCC_2; in accordance with the down counter satisfying the second down count criterion, decreasing/updating 214 the down counter; determining 216 if the down counter satisfies a pulse detection criterion PDC; and in accordance with the down counter satisfying the pulse detection criterion, determining the first pulse parameter and outputting 218 the first pulse parameter and a pulse output signal indicative of detection of a pulse. Thus, the act 112 detecting a pulse based on the pulse input signal and in accordance with a detection of a pulse, outputting a pulse output signal indicative of detection of a pulse is an integrated part of determining 104 pulse parameter(s).

Figure 5:
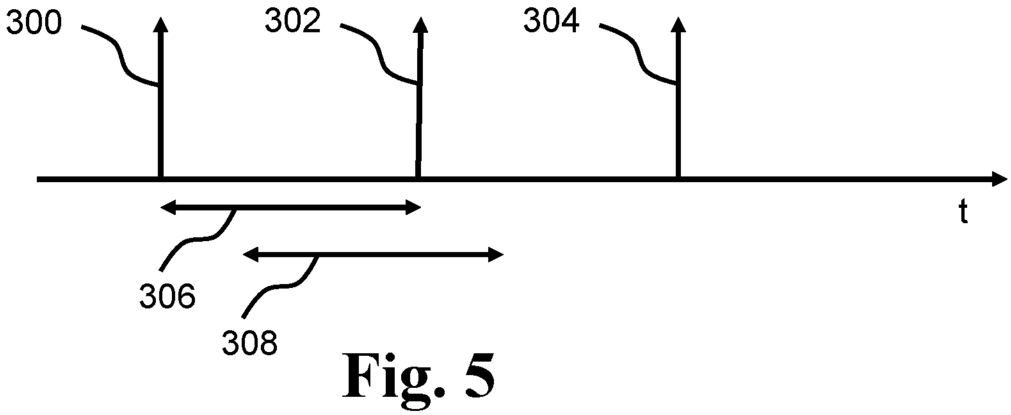
FIG. 5 illustrates smoothing period alignment.

FIG. 5 illustrates pulse detection and power smoothing according to the present disclosure. A pure pulse train comprising first pulse 300, second pulse 302, and third pulse 304 is used as input signal. The pulse train has an average power of P. The line indicates a smoothing period aligned with the exact moment that the first pulse 300 is detected. The line indicates a smoothing period aligned with pulse detection according to the present disclosure. For the smoothing period 306, an infinitely small error or even a slight error in the start and end of the smoothing period 306 would vary the number of pulses located in this period between 0 and 2, resulting in an average power estimate fluctuating between 0 and 2 P. For the smoothing period 308, a slight misalignment in the start and end of the smoothing period 308 will only have effect on the estimate due to a change in period time. Thus, the speech synchronization according to the present disclosure is much more robust against pulse detection errors. It is an important advantage of the present disclosure that only one pulse per smoothing period is ensured, i.e. that pulse detection with low error-rate is provided, which in turn leads to more accurate and precise speech synthesis.

Figure 6:
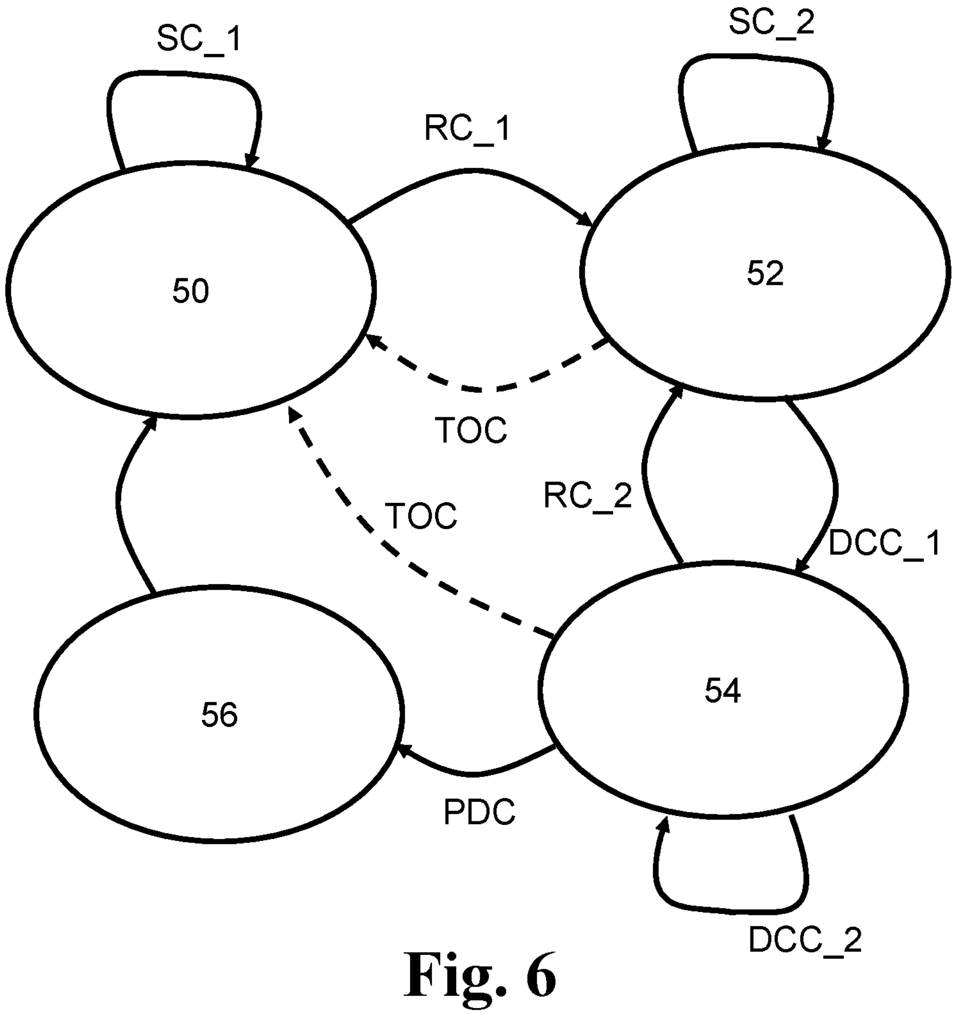
FIG. 6 is an exemplary state diagram of a pulse detector of the hearing device.

FIG. 6 is an exemplary state diagram of a pulse detector. The state diagram comprises a fourth state 56 also denoted an update state. The pulse detector moves from the third state 54 to the fourth state 56 in accordance with the pulse detection criterion being satisfied. The pulse detector is configured to, e.g. in the fourth state 56, update, determine, and/or calculate one or more pulse parameters optionally including one or more of a confidence level, an estimated pulse period, and an estimated pulse height, as described above in relation to FIG. 2. The one or more pulse parameters may be based on the detected/actual pulse (e.g. time of occurrence and height/amplitude) and one or more previously detected pulses (e.g. time of occurrence and height/amplitude). The one or more pulse parameters may be based on a previously determined confidence level.

The use of the terms “first”, “second”, “third” and “fourth”, “primary”, “secondary”, “tertiary” etc. does not imply any particular order but are included to identify individual elements. Moreover, the use of the terms “first”, “second”, “third” and “fourth”, “primary”, “secondary”, “tertiary” etc. does not denote any order or importance, but rather the terms “first”, “second”, “third” and “fourth”, “primary”, “secondary”, “tertiary” etc. are used to distinguish one element from another. Note that the words “first”, “second”, “third” and “fourth”, “primary”, “secondary”, “tertiary” etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-6 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word “comprising” does not necessarily exclude the presence of other elements or steps than those listed.

It is to be noted that the words “a” or “an” preceding an element do not exclude the presence of a plurality of such elements.

It should further be noted that any reference signs do not limit the scope of the claims, that the exemplary embodiments may be implemented at least in part by means of both hardware and software, and that several “means”, “units” or “devices” may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are accordingly to be regarded in an illustrative rather than restrictive sense. The claimed invention is intended to cover all alternatives, modifications, and equivalents.

LIST OF REFERENCES

2 hearing device
4 pulse detector
4A pulse input signal
4B pulse output signal
6 speech synthesizer
8 speech signal
10 processor
12 electrical output signal
14 receiver
15 input power estimator
15A input power input
15B input power output
16 input module
16A input signal
18 first power estimator, period smoother
18A first power output
18B first power input
20 mixing module/mixer
20A mixed output signal
22 second power estimator, filterbank, second estimator
22A second power output, filterbank output, second output
50 first state/rest state
52 second state/rising state
54 third state/down count state
56 fourth state/update state
100 method of speech synthesis in a hearing device
102 obtaining a pulse input signal based on an input signal
102A obtaining a broadband linear power estimate
104 determining one or more pulse parameters based on the pulse input signal
104A determining a first pulse parameter as a confidence level based on the pulse input signal
104B determining a second pulse parameter based on the pulse input signal
106 synthesizing a speech signal based on the first pulse parameter
108 processing the speech signal for provision of an electrical output signal
110 converting the electrical output signal to an audio output signal
112 detecting a pulse based on the pulse input signal and in accordance with a detection of a pulse, outputting a pulse output signal indicative of detection of a pulse
204 determining if the pulse input signal satisfies a first rising criterion RC_1
206 increasing a threshold
208 determining if the pulse input signal satisfies a first down count criterion DCC_1
210 initializing a down counter
212 determining if the down counter satisfies a second down count criterion DCC_2
214 decreasing the down counter
216 determining if the down counter satisfies a pulse detection criterion PDC
218 determining first pulse parameter and outputting the first pulse parameter and a pulse output signal indicative of detection of a pulse
300 first pulse
302 second pulse
304 third pulse
306 smoothing period
308 smoothing period of first power estimator
PP_1 first pulse parameter
PP_2 second pulse parameter
C_L confidence level

The invention claimed is:

1. A method performed by a hearing device, comprising:
obtaining a pulse input signal;
determining one or more pulse parameters including a first pulse parameter after the pulse input signal is obtained;
synthesizing a speech signal based on the first pulse parameter;
processing the speech signal for provision of an electrical output signal; and
converting the electrical output signal to an audio output signal;
wherein the act of determining the one or more pulse parameters comprises:
determining if the pulse input signal satisfies a first rising criterion;
in accordance with the pulse input signal satisfying the first rising criterion, increasing a threshold;
determining if the pulse input signal satisfies a first down count criterion;
in accordance with the pulse input signal satisfying the first down count criterion, initializing a down counter;
determining if the down counter satisfies a second down count criterion;
in accordance with the down counter satisfying the second down count criterion, decreasing the down counter;
determining if the down counter satisfies a pulse detection criterion; and
in accordance with the down counter satisfying the pulse detection criterion, determining the first pulse parameter based on a pulse timer.

2. The method according to claim 1, wherein the act of determining the one or more pulse parameters comprises determining a second pulse parameter based on the pulse input signal;
wherein the act of synthesizing the speech signal is also based on the second pulse parameter.

3. The method according to claim 2, wherein the second pulse parameter is a confidence level indicative of a likelihood of the pulse input signal being a periodic or semi-periodic pulse signal.

4. The method according to claim 1, further comprising: detecting a pulse based on the pulse input signal; and outputting a pulse output signal indicative of the detected pulse.

5. The method according to claim 4, wherein synthesizing the speech signal is based on the pulse output signal.

6. The method according to claim 1, wherein the first pulse parameter is the confidence level, not the pulse period.

7. A hearing device comprising:

a pulse detector configured to determine one or more pulse parameters including a first pulse parameter;

a speech synthesizer coupled to the pulse detector for provision of a speech signal based on the first pulse parameter;

a processor for processing the speech signal for provision of an electrical output signal; and a receiver for converting the electrical output signal to an audio output signal;

wherein the pulse detector is configured to determine the one or more pulse parameters by:

determining if a pulse input signal satisfies a first rising criterion;

in accordance with the input signal satisfying the first rising criterion, increasing a threshold;

determining if the pulse input signal satisfies a first down count criterion;

in accordance with the pulse input signal satisfying the first down count criterion, initializing a down counter;

determining if the down counter satisfies a second down count criterion;

in accordance with the down counter satisfying the second down count criterion, decreasing the down counter;

determining if the down counter satisfies a pulse detection criterion; and in accordance with the down counter satisfying the pulse detection criterion, determining the first pulse parameter based on a pulse timer.

8. The hearing device according to claim 7, wherein the first pulse parameter is a pulse period.

9. The hearing device according to claim 7, wherein the one or more pulse parameters comprises a second pulse parameter; and wherein the speech synthesizer is configured for provision of the speech signal also based on the second pulse parameter.

10. The hearing device according to claim 9, wherein the second pulse parameter is a confidence level indicative of a likelihood of a pulse input signal being a periodic or semi-periodic pulse signal.

11. The hearing device according to claim 7, wherein the pulse detector is configured to detect a pulse, and output a pulse output signal indicative of the detected pulse.

* * * * *